United States Patent [19]
Jin et al.

[11] Patent Number: 5,850,760
[45] Date of Patent: Dec. 22, 1998

[54] BOOSTER FOR TRANSMISSION GEAR BOXES

[75] Inventors: Young Jong Jin; Seung Hwan Bae, both of Kyongsangnam-do, Rep. of Korea

[73] Assignee: Kia Heavy Industries Corporation, Kyongsangnam-do, Rep. of Korea

[21] Appl. No.: 774,823

[22] Filed: Dec. 27, 1996

[30] Foreign Application Priority Data

Dec. 29, 1995 [KR] Rep. of Korea .................. 1995 65449
Dec. 29, 1995 [KR] Rep. of Korea .................. 1995 52610

[51] Int. Cl.⁶ ..................... F16H 59/04; F16H 35/00; F16B 9/10
[52] U.S. Cl. ................. 74/473.11; 74/388 R; 91/374
[58] Field of Search .............. 74/388 R, 473 R, 74/473.11; 91/374

[56] References Cited

U.S. PATENT DOCUMENTS

| | | | |
|---|---|---|---|
| 3,470,759 | 10/1969 | Labat | 74/473 R |
| 4,286,684 | 9/1981 | Cedendahl | 74/473 R |
| 4,485,726 | 12/1984 | Inoue | 74/473 R X |
| 4,519,294 | 5/1985 | Hemens | 91/374 |
| 4,542,662 | 9/1985 | Bieber | 74/470 |
| 4,742,724 | 5/1988 | Jimbo et al. | 74/473 R X |

FOREIGN PATENT DOCUMENTS 92-8093  9/1992  Rep. of Korea .

*Primary Examiner*—Allan D. Herrmann

[57] ABSTRACT

A booster for a transmission gear box has an actuating rod cooperating with a gearshift lever and a hollow piston rod movably penetrating the pneumatic cylinder and cooperating with the actuating rod. A connector is mounted to the piston rod and introduces and discharges pressurized air into and from the piston rod. A striker is coupled to the actuating and piston rods through a pin and is coupled to a connecting lever of the gear box to allow the connecting lever to be operated in conjunction with the actuating and piston rods. The booster prevents a relative rotating motion between the actuating and piston rods, simplifies the gearshift part of the gear box, smoothly engages and disengages gears to the gear box with a small force and provides an easily-machinable hollow piston rod.

11 Claims, 5 Drawing Sheets

Prior Arts

Prior Arts

BOOSTER FOR TRANSMISSION GEAR BOXES

BACKGROUND OF THE INVENTION

1. Field of the Invention

The present invention relates, in general, to a booster for transmission gear boxes of automobiles and, more particularly, to a structural improvement in such a booster for preventing the relative rotating motion between an actuating rod and a hollow piston rod, simplifying the gearshift part of a transmission gear box, smoothly engaging and disengaging gears of the gear box with small force and equal senses while manipulating a gearshift lever to change the speed of a driven shaft between several stages and easily machining the hollow piston rod.

2. Description of the Prior Art

As well known to those skilled in the art, in order to change the speed of a driven shaft of an automobile between several stages, it is necessary to engage and disengage gears of a transmission gear box by manipulating a gearshift lever. In order to change the speed of the driven shaft into one of the 1st, 2nd, 3rd, 4th, 5th and reverse stage with a hand transmission gear box, the gearshift lever is typically manipulated in two steps: a stage zone select step and a gearshift step. During the stage zone select step, the lever is moved in the neutral zone to a position corresponding to a selected stage zone. During the gearshift step, the lever is fully inserted into the selected stage zone. When the gearshift lever is completely inserted into the selected stage zone, the gearshift part of the gear box engages a driven gear, corresponding to the selected stage, with the drive gear thus finishing the change of speed into the selected stage. During the gearshift step, it is necessary for a driver to handle the gearshift lever with force greater than that of the stage zone select step.

Such necessity of greater force during a gearshift step is prominent in the case of buses or trucks equipped with large-scaled transmission gear boxes. In this regard, it is necessary to install a booster inside the transmission gear box of a bus or truck in order to smoothly and easily shift gears of the gear box with small force.

FIG. 1 is a perspective view showing the construction and operation of a transmission gear box provided with a typical booster. Of course, the above gear box is cased by a housing (not shown), but the housing is removed from the gear box of FIG. 1 for ease of showing the construction and operation of the gear box.

As shown in FIG. 1, the gear box comprises a gearshift lever 1, which constitutes a levering motion input means. The gearshift lever 1 is connected to one end of an actuating rod 10 through a link motion 2. A piston rod 20, which constitutes a levering motion output means, is connected to the other end of the actuating rod 10. A striker 3 is mounted to the middle portion of the piston rod 20. The gear box also includes a first lever 4, rotating shaft 5, second lever 6, shift jaw 7, shift rail 8 and shift fork 9, which are orderly connected to and cooperates with the striker 3. That is, the striker 3 is movably fitted into a longitudinal opening 4a of the first lever 4. The lever 4 in turn is fixed to one end of the rotating shaft 5. The second lever 6 is fixed to the other end of the rotating shaft 5. The second lever 6 in turn is coupled to the shift jaw 7 which is fitted over one end portion of the shift rail 8. Meanwhile, the shift fork 9 is fitted over the other end portion of the shift rail 8.

In the operation of the above gear box, the actuating rod 10 is selectively operated when the gearshift lever 1 is manipulated by a driver. The actuating rod 10 in the above state causes the piston rod 20 to linearly and pneumatically reciprocate relative to a pneumatic cylinder thus moving the striker 3 in opposite directions. Since the striker 3 is movably inserted in the longitudinal opening 4a of the first lever 4, such movement of the striker 4 causes the lever 4 to be rotated along with the rotating shaft 5 and thereby causes the second lever 6, shift jaw 7, shift rail 8 and shift fork 9 to be operated in conjunction with the rotating lever 5, thus shifting gears of the gear box.

In the booster of the above gear box, the most important element is the coupling structure of the striker 3 which appropriately transmits power, generated by movement of the actuating and piston rods 10 and 20, to the first lever 4 of the gear box. The construction and operational effect of a typical booster for transmission gear boxes may be referred to Korean Patent Publication No. 92-8093.

As disclosed in the above Korean patent, the typical booster for transmission gear boxes comprises a pneumatic cylinder. A piston rod axially penetrates the cylinder. A piston is fixedly fitted over the piston rod inside the cylinder. A pair of pressure chambers are thus formed inside the cylinder by the piston. An air hose is connected to one end of the piston rod, while an actuating rod is inserted into and coupled to the other end of the piston rod. A valve lift shaft is arranged inside the piston rod and has a lift shaft biasing spring on each end thereof. A pair of passage control valves are connected to the valve lift shaft and are received in the piston rod. The booster further includes a striker which is fitted over the piston rod and transmits the power to the first lever. The above booster is operated as follows. When the link motion and the actuating rod are operated by manipulating the gearshift lever, the control valves are selectively opened thus selectively supplying pressurized air into one of the pressure chambers through the air hose. Therefore, the piston moves in a direction and operates both the piston rod and the striker and thereby operates the transmission gear box.

In the above Korean booster, the striker, which is fitted over the piston rod, includes a detent mechanism. The above detent mechanism has the following operational function. When a driver manipulates the gearshift lever in order to shift gears of the gear box, the passage control valves of the piston rod are operated. When the actuating and piston rods in the above state are allowed to be relatively rotated within a predetermined displacement, the control valves are more easily operated due to the detent mechanism. The above detent mechanism also prevents the relative rotating motion between the actuating rod and the striker thus precisely shifting the gears of the transmission gear box while changing the speed. The above Korean booster is not shown in the accompanying drawings because the construction and operation of the Korean booster are similar to those of the booster according to the invention and have no correlation with the characterized part of this invention. The construction and operation of the above Korean booster may be referred to FIG. 3 of the accompanying drawings.

The typical coupling structure or detent mechanism of the striker included in the booster for transmission gear boxes is shown in FIGS. 2A and 2B in detail. As shown in FIG. 2A, the detent mechanism comprises a check piston 30', which is arranged inside the striker 10' and freely slides in a direction perpendicular to the piston rod 20'. A spring 36' biases the check piston 30 toward the axial direction of the piston rod 20'. The detent mechanism also includes a checked bolt 37' which diametrically and fixedly penetrate into the actuating rod 40'. Two fitting holes 38' and 39' are formed on opposite surfaces of the check piston 30' and check bolt 37', respectively. A ball 50' is fitted into the opening which is formed by the two fitting holes 38' and 39'.

As shown in FIG. 2B, the first fitting hole 38' of the check piston 30' has a circular cross-section, while the second fitting hole 39' of the checked bolt 37' has an oval cross-section. That is, the longer diameter of the oval cross-sectioned area of the second fitting hole 39' extends in the axial direction of the actuating rod 40'. Therefore, the actuating rod 40' can axially slide relative to each of the striker 10' and the piston rod 20' within the longer diameter of the second fitting hole 39' having the oval cross-section. However, the relative rotating motion between the actuating rod 40' and the striker 10' is prevented by the ball 50'.

Because the relative rotating motion between the actuating rod 40' and the striker 10' is prevented by the ball 50', it is possible to prevent the head of the check bolt 37' and the striker 10' from being relatively twisted. Therefore, the piston rod 20' smoothly cooperates with the actuating rod 40' thus smoothly operating the booster.

However, the above booster has the following problems:

First, the detent mechanism, which not only prevents the relative rotating motion between the actuating rod and the striker but also prevents the relative rotating motion between the piston rod and the striker, has a complex construction. That is, the detent mechanism comprises a plurality of elements such as the spring, check piston, ball thus complicating the process of assembling the booster and forcing excessive costs on the owner. In addition, the elements of the detent mechanism are brought into frictional contact with each other in their junctions, thereby reducing the operational effect of the detent mechanism.

Second, the valve lift shaft is arranged inside the piston rod and is biased by two springs on both ends thereof. However, the biasing force of the inside spring is different from that of the outside spring, so that the speed changing senses are regrettably reduced. That is, the lift shaft biasing springs are designed in a way such that the biasing force of the inside spring is higher than that of the outside spring in order to smoothly return the valve lift shaft to the outside. Therefore, a driver feels different senses in accordance with respective stages while shifting the gears of the transmission gear box.

Third, the pressurized air hose has a coupling means in order to directly couple the hose to the piston rod. However, it is very difficult to machine the coupling means since the diameter of the coupling means is larger than the outer diameter of the hose.

Fourth, the valve lift shaft is brought into sliding contact with the internal surface of the hollow piston rod, so that it is necessary to highly precisely machine the internal surface of the piston rod. However, the internal surface of the piston rod must be machined to an axial depth which makes the precise machining of the internal surface difficulty.

SUMMARY OF THE INVENTION

It is, therefore, an object of the present invention to provide a booster for transmission gear boxes of automobiles in which the above problems can be overcome and which prevents the relative rotating motion between the actuating rod and the piston rod, simplifies the gearshift part of the transmission gear box, smoothly engages and disengages gears of the gear box with small force and equal senses while manipulating a gearshift lever to change the speed between several stages and provides an easily-machinable hollow piston rod.

In order to accomplish the above object, the present invention provides a booster for transmission gear boxes, comprising: a pneumatic cylinder; a cylindrical actuating rod cooperating with a gearshift lever thus transmitting a levering motion of the gearshift lever to the booster, the actuating rod having a transverse through hole; a hollow piston rod movably penetrating the pneumatic cylinder in an axial direction and partially receiving the actuating rod on one end thereof thus cooperating with the actuating rod in accordance with a levering motion of the gearshift lever, the piston rod having a piston on its outer surface at a position inside the cylinder thus forming two pressure chambers inside the cylinder; a connector mounted to the other end of the piston rod, the connector being provided with an air inlet port and an air outlet port for introducing and discharging pressurized air into and from the piston rod respectively; a striker coupled to both the actuating rod and piston rod through a first coupling pin thereby moving along with the actuating and piston rods in the same direction, the striker having coupling means for coupling the striker to a connecting lever of a transmission gear box thus allowing the connecting lever to be operated in conjunction with the striker, the first coupling pin passing the transverse through hole of the actuating rod and being fixed to the hollow piston rod on both ends thereof; a booster housing assembled with the pneumatic cylinder while covering the piston rod and the striker; a valve lift shaft coupled to the actuating rod through a second coupling pin inside the piston rod thus being operated in conjunction with the actuating rod; two movable valves provided on both ends of the valve lift shaft, the movable valves selectively moving along with the valve lift shaft in the same direction thus controlling the flow direction of the pressurized air from the connector to the chambers of the cylinder; two valve holding springs symmetrically provided on both ends of the valve lift shaft and biasing the movable valves respectively; two valve seats fitted over the valve lift shaft and brought into slidable contact with the internal surface of the piston rod, the valve seats having a plurality of communication passages In order to introduce or discharge the pressurized air into or from the chambers of the cylinder; two washers fitted over the actuating rod at positions inside the piston rod; and a return spring fitted over the actuating rod and held by the washers and elastically returning the actuating rod to a neutral position when the actuating rod is released from external force.

In an embodiment, the coupling means for coupling the striker to the connecting lever of the gear box comprises: a hollow rod part integrally extending from a boss part of the striker toward the connecting lever; a ball joint seat having a seat opening and tightly fitted into the hollow rod part of the striker; and a connecting rod hinging the connecting lever to the striker, one end of the connecting rod being coupled to the connecting lever and the other end of the connecting rod having a ball joint movably seated in the ball joint seat of the striker.

In another embodiment, the coupling means for coupling the striker to the connecting lever of the gear box comprises: a longitudinal opening formed on the lower end of the connecting lever; a hollow rod part integrally extending from a boss part of the striker toward the connecting lever, the tip of the hollow rod part being movably received in the longitudinal opening of the connecting lever; a fitting hole formed on the piston rod at a position inside the striker; and a fixing bolt unit fitted in the hollow rod part in order to prevent both a relative rotating motion and a relative sliding motion between the striker and the piston rod, the fixing bolt unit comprising a fixing bolt directly fitted into the fitting hole and a fixing ring retaining the bolt in its place inside the hollow rod part of the striker.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 3:
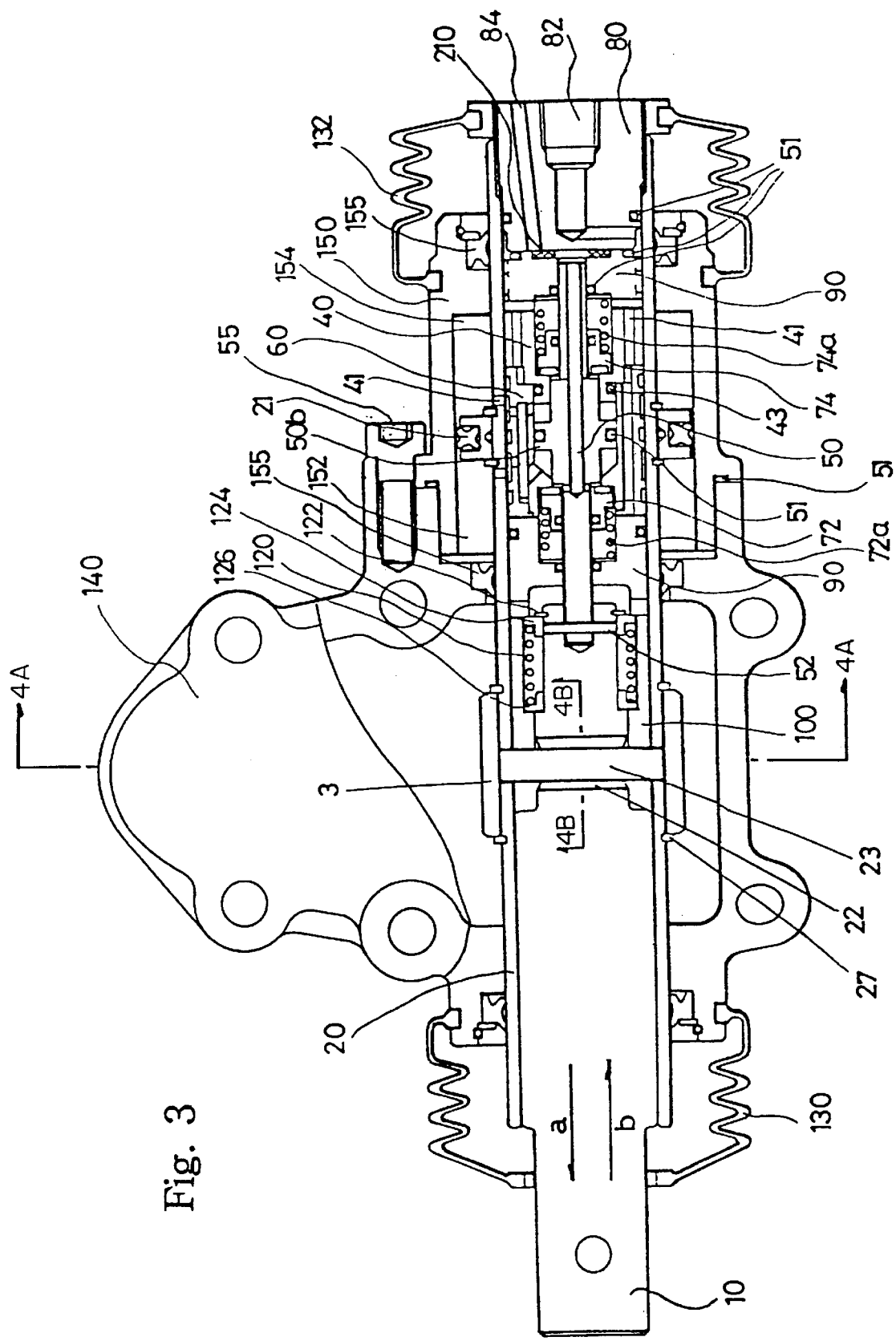
FIG. 3 is a longitudinal-sectioned view showing the construction of a booster for transmission gear boxes in accordance with the primary embodiment of the present invention.

FIG. 3 is a longitudinal-sectioned view showing the construction of a booster for transmission gear boxes in accordance with the primary embodiment of the present invention.

For ease of description, the end of the booster on the left-hand side of FIG. 3 will be referred to as the left end of the booster and the opposite end on the right-hand side of FIG. 3 will be referred to as the right end.

Figure 1:
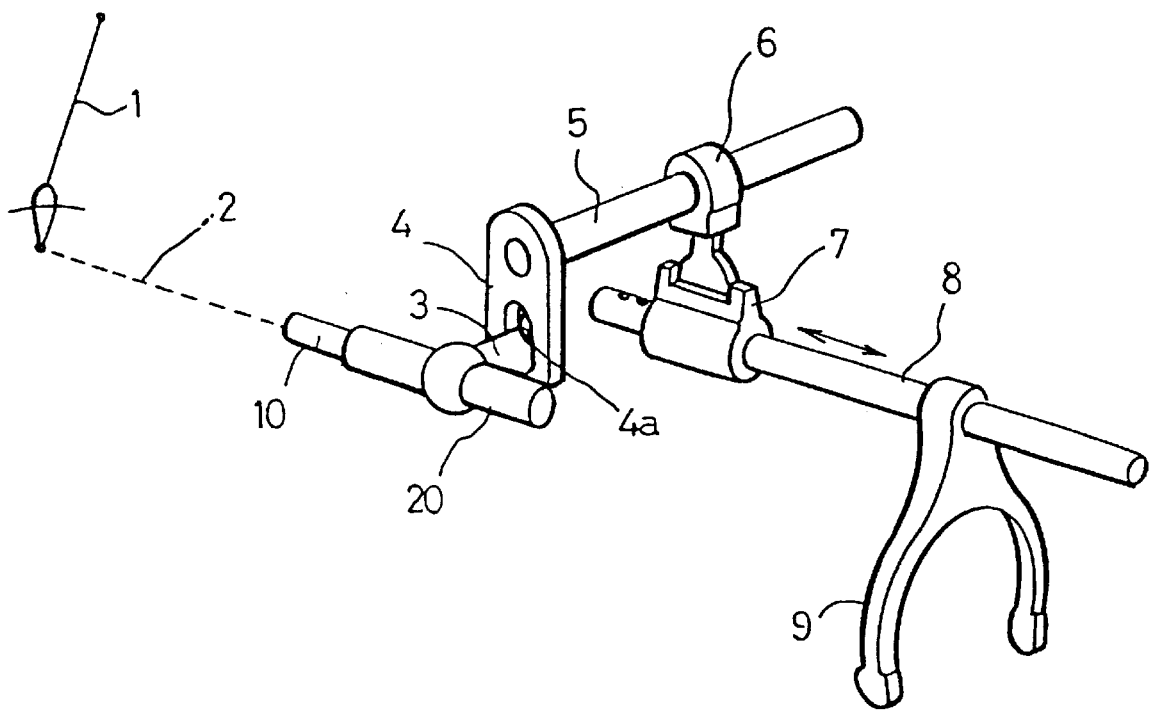
FIG. 1 is a perspective view showing the construction and operation of a transmission gear box provided with a typical booster.
Figures 2A, 2B:
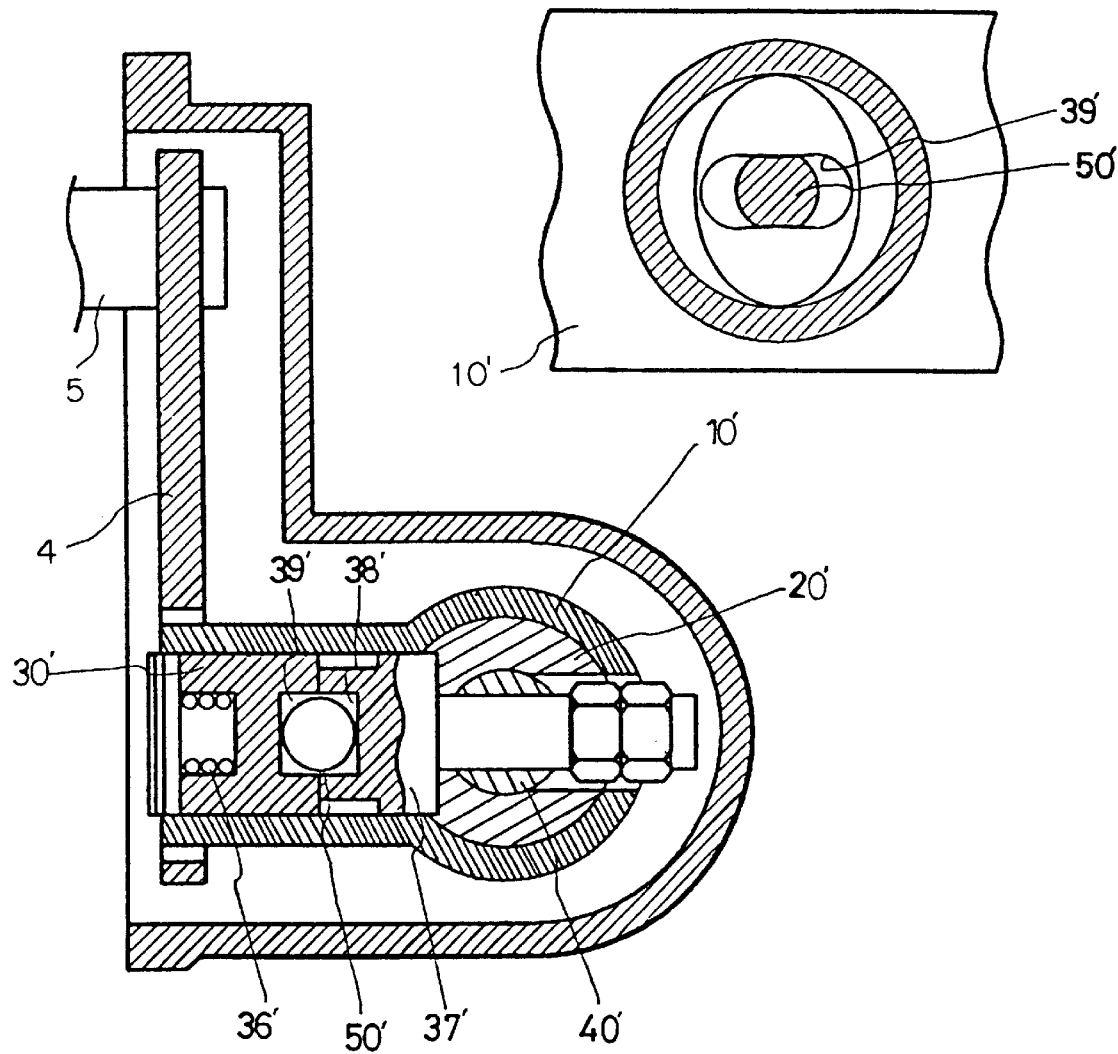
FIGS. 2a and 2B are sectional views showing the construction of a typical detent mechanism included in a typical booster for transmission gear boxes.

As shown in FIG. 1, the booster of this invention comprises a pneumatic cylinder 150 which compresses air and discharges pressurized air. A hollow piston rod 20 movably penetrates the cylinder 150 in an axial direction. A piston 21 is fixedly fitted over the piston rod 20 inside the cylinder 150, thus forming two pressure chambers, that is, a left chamber 152 and a right chamber 154, inside the cylinder 150.

A connector 80, which has an air inlet port 82 and an air outlet port 84, is screwed to the right end of the hollow piston rod 20. Fitted into the left end of the hollow piston rod 20 is a solid actuating rod 10 which transmits a levering motion of a gearshift lever 1 (see FIG. 1) to the piston rod 20. A valve lift shaft 50 is axially arranged inside the right end of the piston rod 20 and is inserted into the right end of the actuating rod 10 inside the rod 20. The shaft 50 is coupled to the actuating rod 10 by a coupling pin 52. Both ends of the valve lift shaft 50 are biased by respective compression coil springs 72a and 74a.

Two movable valves 72 and 74 are symmetrically mounted to the left and right ends of the valve lift shaft 50 and are biased by the respective coil springs 72a and 74a. The booster of this invention also includes a striker 3. The striker 3 is mounted to the piston rod 20 and extends from the rod 20 at right angles thus being coupled to a first lever 4 of a transmission gear box. When the gearshift lever 1 is manipulated by a driver in order to change the speed of a driven shaft of an automobile, the levering motion of the gearshift lever 1 is transmitted to the valve lift shaft 50 through the actuating rod 10 thus operating the movable valves 72 and 74. In accordance with the operation of the valves 72 and 74, pressurized air is introduced into one of the two pressure chambers 152 and 154 of the pneumatic cylinder 150 through the air inlet hole 82. The pressurized air inside either of the chambers 152 and 154 boosts the piston rod 20 to either direction inside the cylinder 150. The boosted linear moving force of the piston rod 20 in turn is transmitted to the first lever 4 through the striker 3.

In order to prevent the relative rotating motion between the actuating rod 10 and the piston rod 20 in the above booster, a first fitting hole 22 having an oval cross-section is transversely formed on the actuating rod 10, while a pin 23 having a circular cross-section passes the first fitting hole 22 with a play gap being formed between the hole 22 and the pin 23. Both ends of the pin 23 project out of the first fitting hole 22 and are fitted into second fitting holes which are formed on diametrically-opposite portions of the hollow piston rod 20.

The striker 3 has a boss part 3a and a rod part 3b which are cast as a single structure. The boss part 3a of the striker 3 is fitted over the piston rod 20 and prevents unexpected separation of the pin 23 from the piston rod 20, while the rod part 3b of the striker 3 extends from the boss part 3a in a direction perpendicular to the piston rod 20 and is coupled to the first lever 4. In the present invention, two fixing rings 27 may be fitted over the piston rod 20 in the junction of the piston rod 20 and the striker 3.

The valve lift shaft 50 is coupled to the right end of the actuating rod 10. A first valve seat 40 is fitted over the right end of the valve lift shaft 50 so as to be movable inside the piston rod 20. A second valve seat 60 is partially seated on the left end of the first valve seat 40 and is brought into slidable contact with the internal surface of the piston rod 20. As described above, both ends of the valve lift shaft 50 are biased by respective coil springs 72a and 74a which are held by the two valve seats 40 and 60. In addition, two movable valves 72 and 74 are symmetrically mounted to the left and right ends of the valve lift shaft 50 and are biased by the respective springs 72a and 74a. The above valves 72 and 74 control the gap between the two valve seats 40 and 60 and control the introduction of pressurized air into the cylinder 150. The connector 80, which has the air inlet port 82 and the air outlet port 84, is screwed to the internal surface of the hollow piston rod 20 at a position in vicinity to the first valve seat 40. An annular spacer 100 is arranged inside the piston rod 20 at a position in the right of the pin 23. A first tube 90 is arranged on the left end of the valve lift shaft 50 at a position in the left of the movable valve 72 with a gap being formed between the actuating rod 10 and the tube 90 by the spacer 100. Meanwhile, a second tube 90 is arranged on the right end of the valve lift shaft 50 at a position in the right of the movable valve 74. The above tubes 90 hold the movable valves 72 and 74, respectively. A filter 210 is interposed between the second tube 90 and the connector 80.

A fixing ring 122 is fitted over the right end of the actuating rod 10 and retains the rod 10 in its original position when the rod 10 is released from external force. A first washer 124 is fitted over the actuating rod 10 at a position in the left of the fixing ring 122 and is brought into contact with the ring 122, thus being stopped by the first tube 90. The above first washer 124 also covers the pin 52 of the valve lift shaft 50 thus preventing the pin 52 from being unexpectedly separated from the coupling portion between the actuating rod 10 and the valve lift shaft 50. The internal wall of the annular spacer 100 is single-stepped, thus forming an annular step. Seated on the annular step of the spacer 100 is a second washer 126. A compression coil spring 120 is fitted over the actuating rod 10 and is held by the two washers 124 and 126 on both end thereof. The above coil spring 120 elastically returns the actuating rod 10 to the original position of the rod 20 when the rod 20 is released from external force.

The middle portion of the valve lift shaft 50 between the two movable valves 72 and 74 has a thickened part 50b which is axially movable inside the second valve seat 60. That is, the thickened part 50b of the valve lift shaft 50 acts as a piston, while the second valve seat 60 acts as a cylinder. A first rubber ring 51 is fitted over the central circumference of the thickened part 50b and is brought into contact with the internal wall of the second valve seat 60.

The connector 80, which is screwed to the internal surface of the right end of the hollow piston rod 20, has the air inlet port 82. The air inlet port 82 of the connector 80 extends on the central axis of the piston rod 20 and introduces pressurized air into one of the pressure chambers 152 and 154 of the pneumatic cylinder 150. The connector 80 also has the air outlet port 84, which slantly extends inside the connector 80 at an angle of inclination relative to the central axis of the piston rod 20 and discharges pressurized air from the cylinder 150. In order to introduce pressurized air into one of the chambers 152 and 154 through the air inlet hole 82 and to discharge pressurized air from the other chamber, a plurality of communication passages 41 are formed on the two valve seats 40 and 60 and on the side wall of the hollow piston rod 20 at positions inside the pressure chambers 152 and 154. The communication passages 41 form a complex passage arrangement. Of course, the passages 41 communicate with the air inlet and outlet ports 82 and 84.

A housing 140 is assembled with the pneumatic cylinder 20 using a plurality of bolts 55. The above housing 140 covers the piston rod 20 and the striker 3. A packing 155 is interposed in the junction between the housing 140, the piston rod 20 and the pneumatic cylinder 150, while another packing 155 is interposed in the junction between the cylinder 150 and the piston rod 20. The above packings 155 prevent leakage of the pressurized air from the booster through the junctions. In addition, a second rubber ring 51 is interposed in the junction between the housing 140 and the cylinder 150 thus preventing leakage of the pressurized air from the cylinder 150 through the junction during the operation of the booster.

In FIG. 1, the reference numeral 43 denotes a third rubber ring which is interposed in the junction between the first and second valve seats 40 and 60. The numerals 130 and 132 denote sealing bellows which are fitted over the rods 10 and 20 respectively.

The above booster is operated as follows.

When the actuating rod 10 is forced to the left as shown in the arrow "a" of FIG. 1, both the pin 23 and the striker 3 are not moved at first due to the actuating rod's fitting hole 22 having the oval cross-section. However, the actuating rod 10 in the above state moves to the left while compressing the coil spring 120 and trailing the valve lift shaft 50 to the left.

When the valve lift shaft 50 moves to the left as described above, the left movable valve 72 of the shaft 50 moves to the left while compressing the coil spring 72a. In the above state, pressurized air is inlet into the hollow piston rod 20 through the air inlet hole 82 of the connector 80 and in turn is introduced into the right pressure chamber 154 of the cylinder 150 through the communication passages 41 thus pushing the piston 21 along with the piston rod 20 to the left. That is, the piston rod 20 is boosted to the left by the pressurized air thus being rapidly moved to the left. The striker 3 is thus moved to the left.

When the actuating rod 10 is returned to its original position (neutral position), the pressurized air is discharged from the right pressure chamber 154 of the cylinder 150 through the air outlet hole 84 of the connector 80, thus moving the piston 21 to the right. In addition, the compression coil spring 120 of the actuating rod 10 and the compression coil spring 72a of the valve 72 elastically returns both the piston rod 20 and the striker 3 to their neutral positions.

Meanwhile, when the actuating rod 10 is forced to the right, the striker 3 is moved to the right as follows.

When the actuating rod 10 is forced to the right as shown in the arrow "b" of FIG. 1, both the pin 23 and the striker 3 are not moved at first due to the actuating rod's fitting hole 22 having the oval cross-section. However, the actuating rod 10 in the above state moves to the right while compressing the coil spring 120 and pushing the valve lift shaft 50 to the right.

When the valve lift shaft 50 moves to the right as described above, the right movable valve 74 of the shaft 50 moves to the right while compressing the coil spring 74a. In the above state, pressurized air is inlet into the hollow piston rod 20 through the air inlet hole 82 of the connector 80 and in turn is introduced into the left pressure chamber 152 of the cylinder 150 through the communication passages 41 thus pushing the piston 21 along with the piston rod 20 to the right. That is, the piston rod 20 is boosted to the right by the pressurized air thus being rapidly moved to the right. The striker 3 is thus moved to the right.

In the operation of the booster of this invention, the piston rod 20 is boosted by pressurized air thus linearly moving the striker 3, which is coupled to the actuating and piston rods 10 and 20, to either direction in accordance with an actuating direction of the actuating rod 10. In addition, the relative rotating motion between the actuating and piston rods 10 and 20 is effectively prevented due to the pin 23 which commonly penetrates the rods 10 and 20.

Figure 4A:
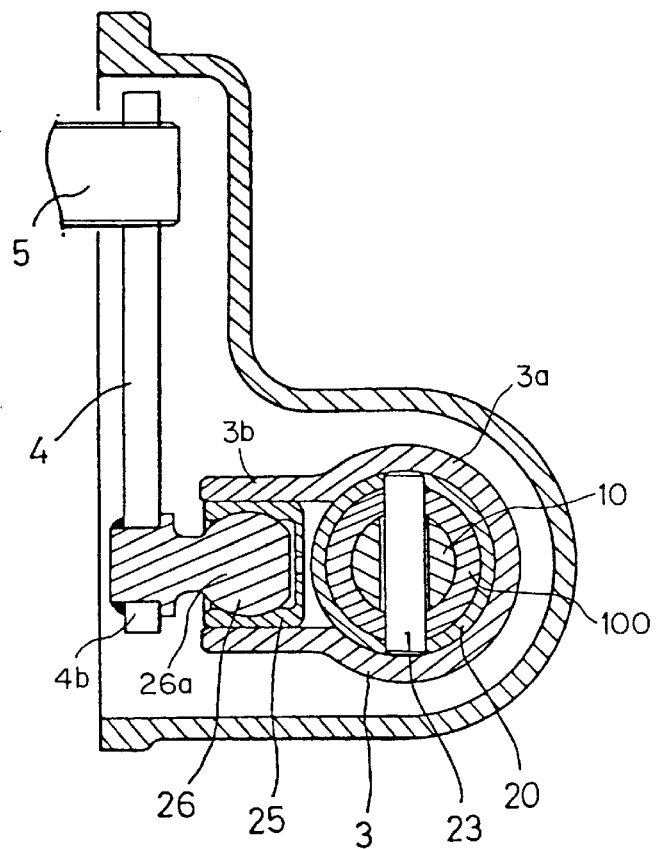
FIGS. 4A and 4B are sectional views taken along the section lines 4A—4A and 4B—4B of FIG. 3 respectively, but showing the construction of a booster's striker in accordance with a second embodiment of the invention.
Figure 4B:
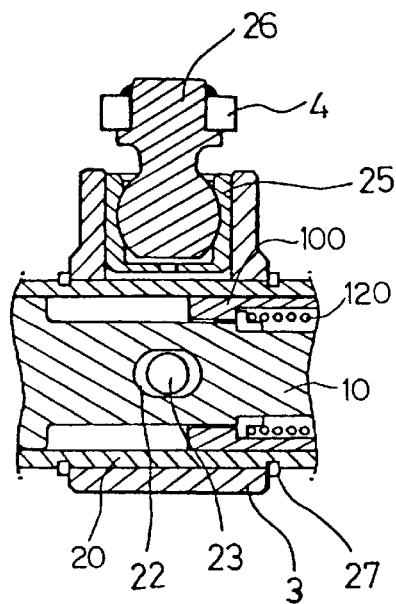

FIGS. 4A and 4B are sectional views taken along the section lines 4A—4A and 4B—4B of FIG. 3 respectively, but showing the construction of a booster's striker in accordance with the second embodiment of the invention.

As described for the primary embodiment, the actuating and piston rods 10 and 20 of the booster are commonly coupled to the striker 3. The striker 3 converts linear reciprocating motions of both rods 10 and 20 into a rotating motion of the first lever 1 of the gear box.

As shown in FIG. 4A, the striker 3 has a boss part 3a and a hollow rod part 3b which are cast as a single structure. The boss part 3a of the striker 3 is fitted over the piston rod 20 thus covering the pin 23, which penetrates the actuating and piston rods 10 and 20, and prevents unexpected separation of the pin 23 from the rods 10 and 20. The hollow rod part 3b of the striker 3 extends from the boss part 3a toward the first lever 4 of the gear box. The two rods 10 and 20 are coupled to the first lever 4 of the gear box through the striker 3 with the following coupling means.

The coupling means of the striker 3 comprises the hollow rod part 3b of the striker 3. A joint seat 25 having a seat opening is tightly fitted into the hollow rod 3a part of the striker 3. The first lever 4 of the gear box is hinged to the striker 3 through a connecting rod 26. That is, the ball joint 26a of the connecting rod 26 is movably seated in the joint seat 25 of the striker 3, thus being hinged to the striker 3. The connecting rod 26 in turn is fixed to the lower end 4b of the first lever 4. As shown in FIG. 4B, two fixing rings 27 may be fitted over the piston rod 20 in the junction of the piston rod 20 and the striker 3. The striker 3 is thus prevented from axially moving relative to the piston rod 20, but is rotatable relative to the piston rod 20 within a predetermined angle.

The above first lever 4, striker 4 and piston rod 20 are operated relative to each other as follows.

When the piston rod 20 linearly moves in either direction, the striker 3 moves in the same direction. The first lever 4, which is hinged to the striker 3 through the connecting rod 26, is thus rotated about the shaft 5. The striker 3 in the above state is rotated about the piston rod 20 at an angle being equal to the rotating angle of the lever 4 since the striker 3 is rotatable relative to the piston rod 20 as described above.

Figure 5A:
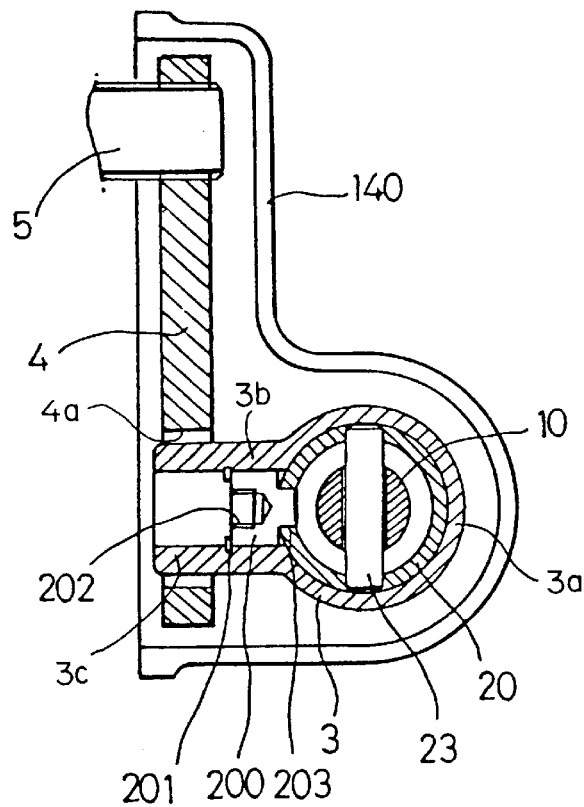
FIGS. 5A and 5B are sectional views as if taken along the section lines 4A—4A and 4B—4B of FIG. 3 respectively, but showing the construction of a booster's striker in accordance with a third embodiment of the invention.
Figure 5B:
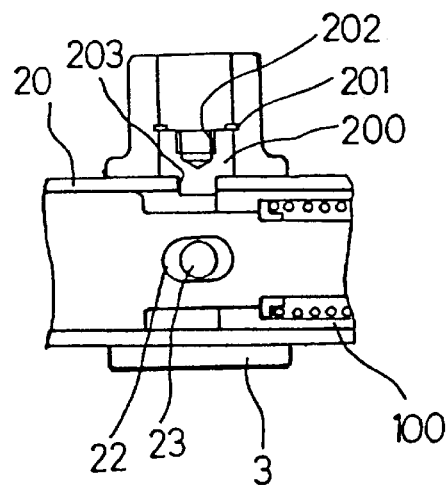

FIGS. 5A and 5B are sectional views as if taken along the section lines 4A—4A and 4B—4B of FIG. 3 respectively, but showing the construction of a booster's striker in accordance with the third embodiment of the invention.

As shown in FIGS. 5A and 5B, the general shape of the striker 3 according to the third embodiment remains the same as described for the second embodiment, but the coupling means for connecting the striker 3, first lever 4 and two rods 10 and 20 together are alternated as follows.

The lower end 46 of the first lever 4 is provided with a longitudinal opening 4a. Meanwhile, the striker 3 has a boss part 3a and a rod part 3b which are cast as a single structure. The boss part 3a of the striker 3 is fitted over the piston rod 20 thus covering the pin 23. The rod part 3b of the striker 3 extends from the boss part 3a toward the first lever 4 of the gear box. The rod part 3b of the striker 3 is hollowed. The tip 3c of the rod part 3b of the striker 3 is movably received in the longitudinal opening 4a of the first lever 4. A fitting hole 203 is formed on the piston rod 20 at a position inside the boss part 3a of the striker 3. A fixing bolt unit 200 is fitted into the fitting hole 203 thus preventing both a relative rotating motion and a relative sliding motion between the striker 3 and the piston rod 20. The above unit 200 comprises a fixing bolt 202 which is directly fitted into the fitting hole 203. The fixing bolt 202 is stopped by a fixing ring 201 on its rear end thereby being retained in its place inside the hollow rod part of the striker 3.

That is, the striker 3 of the third embodiment is hinged to the first lever 4 while it is fixed to the piston rod 20. The striker 3 is prevented from axially moving relative to the piston rod 20 and from being rotated about the rod 20 due to the fixing bolt unit 200.

When the piston rod 20 linearly moves in either direction, the striker 3 fixed to the piston rod 20 rotates the first lever 4 about the rotating shaft 5 of the gear box.

In the third embodiment, the first lever 4 of a gear box is provided with the longitudinal opening 4a for movably receiving the rod part 3b of the striker 3, so that it is not necessary to rotate the striker 3 about the piston rod 20. Therefore, the coupling structure between the striker 3 and the first lever 4 comprises the fixing bolt unit 200. Due to the fixing bolt unit 200, the booster according to the third embodiment is free from the need for the fixing rings 27 different from the second embodiment.

As described above, the present invention provides a booster for transmission gear boxes. The booster of this invention has the following advantages:

First, the booster of this invention simplifies the construction of a striker's coupling structure, which prevents the relative rotating motion between the actuating rod and the striker and/or the relative rotating motion between the hollow piston rod and the striker. That is, the coupling means for connecting the striker, first lever and actuating and piston rods together in accordance with this invention may comprise a ball joint or a fixing bolt unit. Due to the simple coupling means, the number of parts of the booster is reduced thereby simplifying the process of assembling the booster and reducing the manufacturing cost of the booster. In addition, such a simple coupling means reduces the number of frictional contact junctions of the booster and thereby smoothly operates the booster.

Second, the actuating rod of the booster according to this invention is biased by a coil spring, while both ends of a valve lift shaft are biased by respective coil springs. The above coil springs smoothly return both the piston rod and the striker to their original positions (neutral positions). In addition, pressurized air is applied to either of the two chambers inside the pneumatic cylinder thus smoothly boosting the piston rod to either direction with the same force. Therefore, the booster of this invention improves the gearshift senses and it is possible for a driver to feel equal senses while shifting the gears of the transmission gear box.

Third, the air hose, which introduces pressurized air into either of the chambers of the cylinder, is not directly connected to the hollow piston rod but is indirectly connected to the piston rod through a connector. That is, the air hose of this booster is always connected to the connector thus having an improved durability.

Fourth, the valve lift shaft of this booster is not brought into direct sliding contact with the internal surface of the hollow piston rod but is brought into contact with two valve seats, so that it is not necessary to highly precisely machine the internal surface of the piston rod during the process of producing the booster. Therefore, the booster of this invention can be produced at low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A booster for transmission gear boxes, comprising:
   a pneumatic cylinder;
   a cylindrical actuating rod cooperating with a gearshift lever to thereby transmit a levering motion of said gearshift lever to the booster, said actuating rod having a transverse through hole;
   a hollow piston rod movably penetrating said pneumatic cylinder in an axial direction and partially receiving said actuating rod on one end thereof thus cooperating with said actuating rod in accordance with a levering motion of the gearshift lever, said piston rod having a piston on its outer surface at a position inside the cylinder to thereby form two pressure chambers inside the cylinder;
   a connector mounted to the other end of said piston rod, said connector including an air inlet port and an air outlet port for introducing and discharging pressurized air into and from the piston rod respectively;
   a striker coupled to both the actuating rod and piston rod through a first coupling pin thereby moving along with said actuating and piston rods in the same direction, said striker having coupling means for coupling the striker to a connecting lever of a transmission gear box to enable the connecting lever to be operated in conjunction with the striker, said first coupling pin passing said transverse through hole of the actuating rod and being fixed to said hollow piston rod on both ends thereof;

a booster housing assembled with said pneumatic cylinder and covering the piston rod and the striker;

a valve lift shaft coupled to said actuating rod through a second coupling pin inside said piston rod thus being operated in conjunction with said actuating rod;

two movable valves provided on both ends of said valve lift shaft, said movable valves selectively moving along with said valve lift shaft in the same direction to control the flow direction of said pressurized air from the connector to the chambers of the cylinder;

two valve holding springs symmetrically provided on both ends of said valve lift shaft and biasing said movable valves respectively;

two valve seats fitted over said valve lift shaft and brought into slidable contact with the internal surface of said piston rod, said valve seats having a plurality of communication passages to introduce or discharge the pressurized air into or from the chambers of the cylinder;

two washers fitted over the actuating rod at positions inside the piston rod; and a return spring fitted over said actuating rod and held by said washers and elastically returning the actuating rod to a neutral position when the actuating rod is released from external force.

2. The booster according to claim 1, further comprising a first packing is interposed in the junction between said housing, said piston rod and said pneumatic cylinder and a second packing interposed in the junction between said pneumatic cylinder and said piston rod.

3. The booster according to claim 1, further comprising a rubber ring interposed in the junction between said housing and said cylinder thus preventing leakage of the pressurized air from the cylinder.

4. The booster according to claim 1, further comprising:

a tube arranged on said valve lift shaft at a position beside the connector; and a filter interposed between said tube and said connector.

5. The booster according to claim 1, wherein said transverse through hole of the actuating rod has a diameter larger than that of said first coupling pin thus allowing the first coupling pin to be movable inside the through hole.

6. The booster according to claim 1, wherein one of said washers fitted over the actuating rod stops the second coupling pin to prevent the second coupling pin from being unexpectedly separated from the coupling portion between the actuating rod and the valve lift shaft, said washer being held by a fixing ring fitted over said actuating rod.

7. The booster according to claim 1, further comprising:

a thickened part formed on said valve lift shaft at a position between the two movable valves and acting as a piston axially movable inside one of said valve seats; and a rubber ring fitted over said thickened part and brought into contact with the internal wall of said valve seat acting as a cylinder.

8. The booster according to claim 1, wherein said coupling means for coupling the striker to said connecting lever of the gear box comprises:

a hollow rod part integrally extending from a boss part of said striker toward said connecting lever;

a ball joint seat having a seat opening and tightly fitted into said hollow rod part of the striker; and a connecting rod hinging the connecting lever to the striker, one end of said connecting rod being coupled to said connecting lever and the other end of said connecting rod having a ball joint movably seated in said ball joint seat of the striker.

9. The booster according to claim 1, wherein said coupling means for coupling the striker to said connecting lever of the gear box comprises:

a longitudinal opening formed on the lower end of said connecting lever;

a hollow rod part integrally extending from a boss part of said striker toward said connecting lever, a tip of said hollow rod part being movably received in said longitudinal opening of the connecting lever;

a fitting hole formed on said piston rod at a position inside said striker; and a fixing bolt unit fitted in said hollow rod part in order to prevent both a relative rotating motion and a relative sliding motion between said striker and said piston rod, said fixing bolt unit comprising a fixing bolt directly fitted into said fitting hole and a fixing ring retaining said bolt in its place inside the hollow rod part of the striker.

10. The booster according to claim 1, further comprising:

a fixing ring fitted over the piston rod in the junction of the piston rod and the striker, thus preventing the striker from axially moving relative to the piston rod but allowing the striker to be rotatable relative to the piston rod.

11. The booster according to claim 8, further comprising:

a fixing ring fitted over the piston rod in the junction of the piston rod and the striker, thus preventing the striker from axially moving relative to the piston rod but allowing the striker to be rotatable relative to the piston rod.

* * * * *